(12) United States Patent
Kim

(10) Patent No.: US 9,804,860 B2
(45) Date of Patent: Oct. 31, 2017

(54) MEMORY SYSTEM HAVING SLEEP MODE AND WAKE UP MODE AND OPERATION METHOD THEREOF

(71) Applicant: SK hynix Inc., Gyeonggi-do (KR)

(72) Inventor: Kwang-Su Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 14/962,260

(22) Filed: Dec. 8, 2015

(65) Prior Publication Data

US 2017/0052577 A1 Feb. 23, 2017

(30) Foreign Application Priority Data

Aug. 17, 2015 (KR) .................. 10-2015-0115392

(51) Int. Cl.
*G06F 9/00* (2006.01)
*G06F 9/44* (2006.01)
*G06F 3/06* (2006.01)
*G06F 1/32* (2006.01)

(52) U.S. Cl.
CPC .......... *G06F 9/4418* (2013.01); *G06F 1/3275* (2013.01); *G06F 1/3287* (2013.01); *G06F 3/0625* (2013.01); *G06F 3/0634* (2013.01); *G06F 3/0652* (2013.01); *G06F 3/0673* (2013.01); *Y02B 60/1228* (2013.01); *Y02B 60/1282* (2013.01)

(58) Field of Classification Search
CPC ........ G06F 1/24; G06F 3/0652; G06F 1/3287; G06F 9/4418; G06F 3/0625; G06F 3/0673; G06F 3/0634; G06F 13/1694; G06F 1/3203; G06F 1/3275; H01L 25/18; G11C 5/148; G11C 29/028; G11C 7/22; Y02B 60/1282; Y02B 60/1228
USPC ............ 711/170, 154, 167; 365/185.18, 226; 713/323
See application file for complete search history.

(56) References Cited

U.S. PATENT DOCUMENTS

| | | | |
|---|---|---|---|
| 2001/0000822 A1* | 5/2001 | Dell .................... | G06F 13/1694 711/170 |
| 2007/0234083 A1* | 10/2007 | Lee ....................... | G06F 1/3203 713/300 |
| 2009/0077436 A1* | 3/2009 | Lo ........................ | G11C 7/1045 714/718 |
| 2009/0198924 A1* | 8/2009 | Shaeffer ................ | G11C 5/025 711/154 |
| 2012/0142299 A1 | 6/2012 | Jin et al. | |
| 2014/0133240 A1* | 5/2014 | Chen ..................... | G11C 16/30 365/185.18 |

(Continued)

FOREIGN PATENT DOCUMENTS

KR 1020130018539 2/2013

*Primary Examiner* — Hong Kim
(74) *Attorney, Agent, or Firm* — IP & T Group LLP

(57) ABSTRACT

A memory system may include: a memory device that operates using a first voltage received from a host and suitable for storing a value of operation information, and waking up from a sleep state in response to a request of the host; and a controller that operates using a second voltage received from the host, and suitable for selectively resetting the memory device according to a result obtained by checking a value of operation information of the memory device, when waking up the memory device in a sleep state according to a request of the host.

17 Claims, 11 Drawing Sheets

(56) References Cited

U.S. PATENT DOCUMENTS

| | | | |
|---|---|---|---|
| 2014/0157030 A1* | 6/2014 | Park | G06F 1/3275 |
| | | | 713/323 |
| 2016/0012867 A1* | 1/2016 | Chhabra | G11C 5/148 |
| | | | 365/226 |

* cited by examiner

MEMORY SYSTEM HAVING SLEEP MODE AND WAKE UP MODE AND OPERATION METHOD THEREOF

CROSS-REFERENCE TO RELATED APPLICATIONS

This application claims priority under 35 U.S.C. §119 to Korean Patent Application No. 10-2015-0115392, filed on Aug. 17, 2015 in the Korean Intellectual Property Office, the disclosure of which is incorporated herein by reference in its entirety.

BACKGROUND

1. Field

Exemplary embodiments of the present invention relate to a semiconductor design technology, and more particularly, to a memory system which supports a sleep mode operation and an operation method thereof.

2. Description of the Related Art

The computer environment paradigm has shifted to ubiquitous computing systems that can be used anytime and anywhere. As a result, use of portable electronic devices such as mobile phones, digital cameras, and notebook computers continues to increase rapidly. Portable electronic devices generally use a memory system employing one or more semiconductor memory devices for storing data. A semiconductor memory device may be used as a main memory device or an auxiliary memory device of a portable electronic device.

Semiconductor memory devices provide excellent stability, durability, high information access speed, and low power consumption, since they have no moving parts. Examples of semiconductor memory devices having such advantages include universal serial bus (USB) memory devices, memory cards having various interfaces, and solid state drives (SSD).

SUMMARY

Various embodiments are directed to a memory system capable of easily checking whether power supply has been stopped while a memory device was in a sleep mode, and an operation method thereof.

In an embodiment, a memory system may include: a memory device that operates using a first voltage received from a host, wherein memory device is suitable for storing a value of operation information and waking up from a sleep state in response to a request of the host; and a controller that operates using a second voltage received from the host, wherein the controller is suitable for checking the value of operation information and selectively resetting the memory device according to the value of operation information when the memory device wakes up from the sleep state.

The operation information may be stored in a first storage region of the memory device and transmitted to a second storage region of the memory device when the memory device wakes up wherein the controller cannot access the first storage region and can access the second storage region.

The first voltage may be selectively supplied to the memory device according to operation of the host when the memory device is in the sleep state.

The operation information stored in the first storage region may be retained while the first voltage is not supplied to memory device, and the operation information stored in the second storage region may be reset when the first voltage is not supplied to the memory device.

The controller may read the operation information stored in the second storage region when the memory device is waken up and resets the memory device, the controller may reset the memory device when the operation information stored in the second storage region is reset and the controller may not reset the memory device when the operation information stored in the second storage region is not reset.

The controller may control so that the memory device enters the sleep state according to a request from the host.

The controller may determine that the memory device is at an idle state when no request is provided from the host to the memory device during a preset time period, and the controller may control the memory device to enter the sleep state when the memory device is at the idle state.

The operation information may include identification information, capacity information, and setting information of the memory device, and the operation information may be not accessible by the host.

In an embodiment, there is provided an operation method of a memory system which includes the memory system includes a memory device and a controller, may include: operating the memory device using a first voltage received from a host; and operating the controller using a second voltage received from the host, wherein the operating of the controller may include: checking operation information of the memory device when the memory device wakes up from a sleep state according to a request of the host; and selectively resetting the memory device according to a result of the checking of the operation information.

The operation method may further include: storing the operation information in a first storage region of the memory device, wherein the first storage region is not accessed by the controller, and transmitting the operation information to a second storage region of the memory device when the memory device wakes up, wherein the controller can access the second storage region.

The first voltage may be selectively supplied to the memory device according to the operation of the host when the memory device is in the sleep state.

The operation information stored in the first storage region may be retained when the first voltage is not supplied to the memory device, and the operation information stored in the second storage region may be reset when the first voltage is not supplied to the memory device.

The checking of the operation information may include: checking whether the operation information stored in the second storage region is reset when the memory device wakes up.

The selectively resetting of the memory device may include: resetting the memory device when it is determined that the operation information stored in the second storage region is reset; and not resetting the memory device when it is determined that the operation information stored in the second storage region is not reset.

The operating of the controller may further include: controlling the memory device so that the memory device enters the sleep state according to a request from the host.

The operating of the controller may further include: determining that the memory device is in an idle state when no request is provided to the memory device from the host during a preset time period, and controlling the memory device so that the memory device enters the sleep state when the memory device is in the idle state.

The operation information may include identification information, capacity information, and setting information of the memory device, and the operation information may be not accessible by the host.

DETAILED DESCRIPTION

Figure 1:
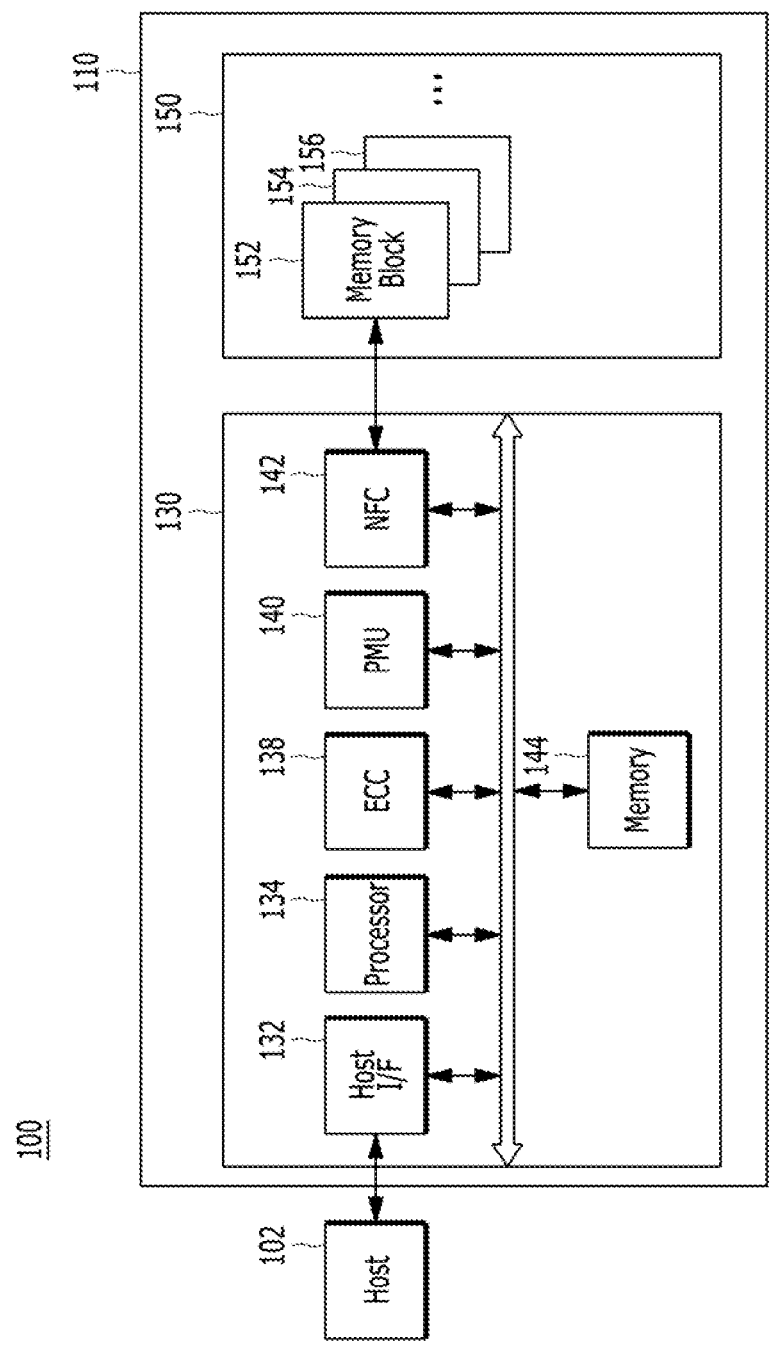
FIG. 1 is a block diagram illustrating a data processing system including a memory system, according to an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Referring to FIG. 1, a data processing system 100 is provided, according to an embodiment of the invention. The data processing system 100 may include a host 102 and a memory system 110.

The host 102 may include any suitable electronic device. For example, the host 102 may include a portable electronic device such as a mobile phone, an MP3 player, a laptop computer and the like. The host may include a non-portable electronic device such as a desktop computer, a game player, a TV, a projector and the like.

The memory system 110 may operate in response to a request from the host 102. For example, the memory system may store data to be accessed by the host 102. The memory system 110 may be used as a main memory system or an auxiliary memory system of the host 102. The memory system 110 may be implemented with any suitable storage device, according to the protocol of a host interface electrically coupled with the host 102. One or more semiconductor memory devices may be used. Volatile or non-volatile memory devices may be used. For example, the memory system 110 may be implemented with a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device a universal flash storage (UFS) device a compact flash (CF) card, a smart media (SM) card, a memory stick, and the like.

The storage devices for the memory system 110 may be Implemented with a volatile memory device, such as a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), a resistive RAM (RRAM) and the like.

The memory system 110 may include a memory device 150 which stores data to be accessed by the host 102, and a controller 130 which may control storage of data in the memory device 150.

The controller 130 and the memory device 150 may be integrated into a single semiconductor device. For instance, the controller 130 and the memory device 150 may be integrated into one semiconductor device configured as a solid state drive (SSD). Configuring the memory system 110 as an SSD, may generally allow a significant increase in the operation speed of the host 102.

The controller 130 and the memory device 150 may be integrated into a single semiconductor device configured as a memory card, such as a Personal Computer Memory Card International Association (PCMCIA) card, a compact flash (CF) card, a smart media (SM) card (SMC), a memory stick, a multimedia card (MMC), an RS-MMC and a micro-MMC a secure digital (SD) card, a mini-SD, a micro-SD and an SDHC, a universal flash storage (UFS) device and the like.

Also, for example, the memory system 110 may be or configure a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP) a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device may store data provided from the host 102 during a write operation and provide the stored data to the host 102 during a read operation. The memory device 150 may include one or more memory blocks 152, 154 and 156. Each of the memory blocks 152, 154 and 156 may include a plurality of pages. Each of the pages may include a plurality of memory cells to which a plurality of word lines (WL) may be electrically coupled. The memory device 150 may be a nonvolatile memory device retaining stored data when power supply is interrupted According to an embodiment the memory device may be a flash memory. The memory device may be a flash memory device having a three-dimensional (3D) stack structure. An example of a non-volatile memory device 150 having a three-dimensional (3D) stack structure is described later herein with reference to FIGS. 2 to 11.

The controller 130 of the memory system 110 may control the memory device 150 in response to a request from the host 102. The controller 130 may provide data read from the memory device 150, to the host 102, and store the data provided from the host 102 into the memory device 150. To this end, the controller 130 may control overall operations of the memory device 150, such as read, write, program and erase operations.

Any suitable controller may be used. For example, the controller 130 may include a host interface unit 132, a processor 134 an error correction code (ECC) unit 138, a power management unit 140, a NAND flash controller 142, and a memory 144.

The host interface unit 132 may process commands and/or data provided from the host 102. The host interface unit 132 may communicate with the host 102 through at least one of various interface protocols such as universal serial bus (USB), multimedia card (MMC) peripheral component interconnect-express (PCI-E), serial attached SCSI (SAS), serial advanced technology attachment (SATA), parallel advanced technology attachment (PATA), small computer system interface (SCSI), enhanced small disk interface (ESDI), integrated drive electronics (IDE) and the like.

The ECC unit 138 may detect and correct errors in the data read from the memory device 150 during a read operation. Various detection and correction techniques may be employed. For example, the ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code a turbo code, a Reed-Solomon (RS) code, a convolution code, a recursive systematic code (RSC), a trellis-coded modulation (TCM), a Block coded modulation (BCM), and the like. The ECC unit 138 may include any and all suitable circuits systems or devices required for an error detection and correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102. The NFC 142 may generate control signals for the memory device 150. The NFC may process data under the control of the processor 134, for example when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150 the memory 144 may store data used by the controller 130 and the memory device 150 for such operations as read, write, program and erase operations.

The memory 144 may be implemented with volatile memory. For example, the memory 144 may be implemented with a static random access memory (SRAM) or a dynamic random access memory (DRAM). As described above, the memory 144 may store data used by the host 102 and the memory device 150 for the read and write operations. To store the data, the memory 144 may include a program memory, a data memory, a write buffer, a read buffer, a map buffer, and so forth.

The processor 134 may control one or more general operations of the memory system 110. The processor 134 may control a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor. The processor may be implemented with a central processing unit (CPU).

A management unit (not shown) may be included in the processor 134, and may perform, for example, bad block management of the memory device 150. Accordingly, the management unit may find bad memory blocks included in the memory device 150, which are in unsatisfactory condition for further use, and perform bad block management on the bad memory blocks. When the memory device 150 is a flash memory, for example, a NAND flash memory, a program failure may occur during a write operation due to characteristics of a NAND logic function. Bad block management may program the data of the program-failed memory block or the bad memory block into a new memory block. Bad blocks due to a program fail may deteriorate the utilization efficiency of a memory device, especially one having a 3D stack structure and thus negatively affect the reliability of the memory system 100.

Figure 2:
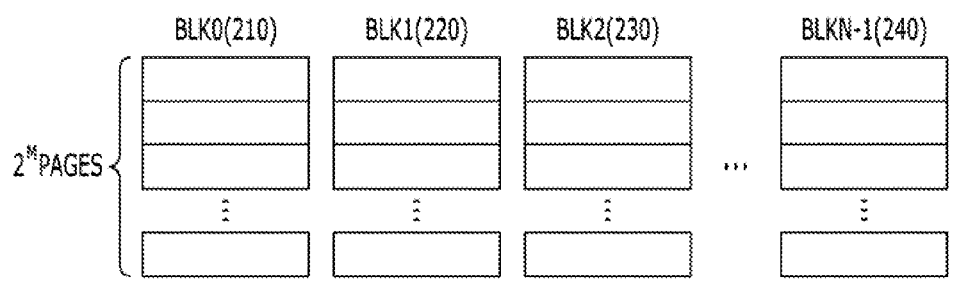
FIG. 2 is a schematic diagram illustrating a memory device, according to an embodiment of the present invention.

Referring to FIG. 2, according to an embodiment, the memory device 150 may include a plurality of memory blocks, for example, zeroth to $(N-1)^{th}$ blocks 210 to 240. Each of the plurality of memory blocks 210 to 240 may include a plurality of pages, for example, $2^M$ number of pages ($2^M$ PAGES). Each of the plurality of pages may include a plurality of memory cells to which a plurality of word lines are electrically coupled.

The memory blocks may be single level cell (SLC) memory blocks or multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. A MLC memory block including a plurality of pages which are implemented with memory cells that are each capable of storing 3-bit data may be employed and will be referred to as a triple level cell (TLC) memory block.

Each of the plurality of memory blocks 210 to 240 may store data provided from the host device 102 during a write operation, and may provide stored data to the host 102 during a read operation.

Figure 3:
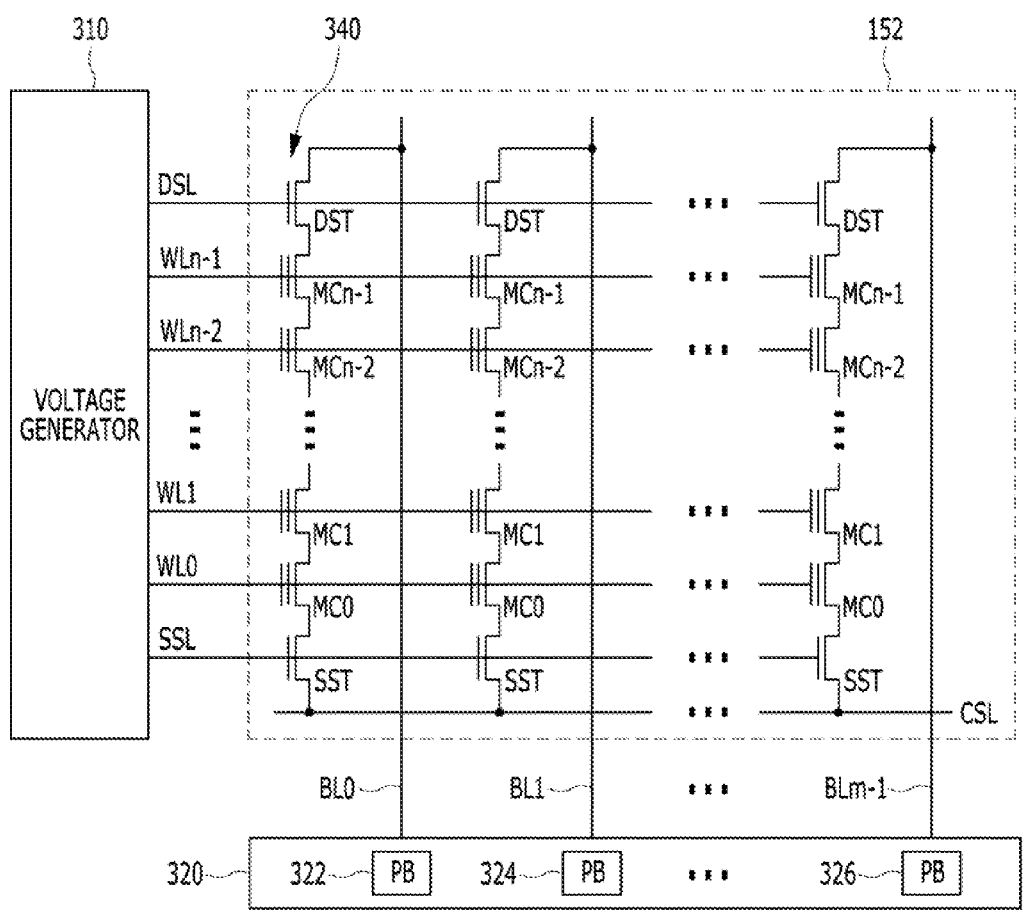
FIG. 3 is a circuit diagram illustrating a memory block of a memory device, according to an embodiment of the present Invention.

Referring to FIG. 3, a memory block 152 of the memory device 150 may include a plurality of cell strings 340 which are electrically coupled to bit lines BL0 to BLm−1, respectively. The cell string 340 of each column may include at least one drain select transistor DST and at least one source select transistor SST. A plurality of memory cells or a plurality of memory cell transistors MC0 to MCn−1 may be electrically coupled in series between the select transistors DST and SST. The respective memory cells MC0 to MCn−1 may be configured by multi-level cells (MLC) each of which stores data information of a plurality of bits. The strings 340 may be electrically coupled to the corresponding bit lines BL0 to BLm−1, respectively. For reference, in FIG. 3, 'DSC' denotes a drain select line, 'SSL' denotes a source select line, and CSL' denotes a common source line.

While the memory block 152 is configured by NAND flash memory cells, it is to be noted that the memory block 152 may be realized, in other embodiments, by NOR flash memory, hybrid flash memory in which at least two kinds of memory cells are combined, or one-NAND flash memory in which a controller is built in a memory chip. Also, the operational characteristics of a semiconductor device may be applied to not only a flash memory device in which a charge storing layer is configured by conductive floating gates but also to a charge trap flash (CTF) in which a charge storing layer is configured by a dielectric layers.

A voltage supply block 310 of the memory device 150 may provide word line voltages, for example, a program voltage, a read voltage or a pass voltage, to be supplied to respective word lines according to an operation mode. The voltage supply block 310 may provide voltages to be supplied to bulks, for example, well regions in which the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers 322, 324 and 326 respectively corresponding to columns (or bit lines) or pairs of columns (or pairs of bit lines) and a plurality of latches (not shown) may be included in each of the page buffers 322, 324 and 326.

FIGS. 4 to 11 are schematic diagrams illustrating various aspects of a memory device 150.

As shown in FIGS. 4 to 11., the memory, device 150 may include a plurality of memory blocks BLK0 to BLKN−1, and each of the memory blocks BLK0 to BLKN−1 may be realized in a three-dimensional (3D) structure or a vertical structure. The respective memory blocks BLK0 to BLKN−1 may include structures which extend in first to third directions, for example, an x-axis direction, a y-axis direction and a z-axis direction.

Figure 8:
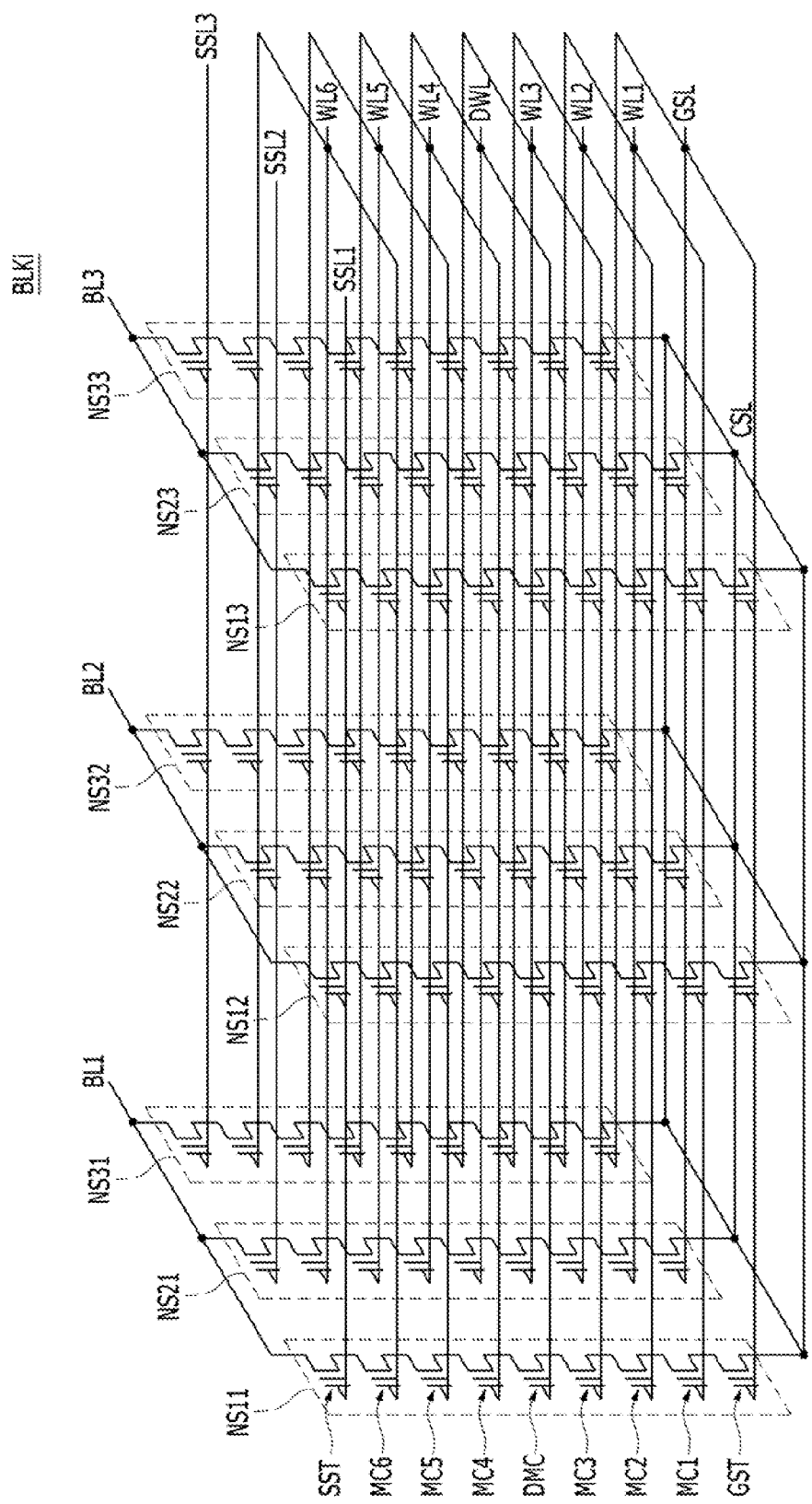

The respective memory blocks BLK0 to BLKN−1 may include a plurality of NAND strings NS which extend in the second direction (FIG. 8). The plurality of NAND strings NS may be provided in the first direction and the third direction. Each NAND string NS may be electrically coupled to a bit line BL, at least one source select line SSL, at least one ground select line GSL, a plurality of word lines WL, at least one dummy word line DWL, and a common source line CSL. The respective memory blocks BLK0 to BLKN−1 may be electrically coupled to a plurality of bit lines BL, a plurality of source select lines SSL, a plurality of ground select lines GSL, a plurality of word lines WL, a plurality of dummy word lines DWL, and a plurality of common source lines CSL.

Figure 4:
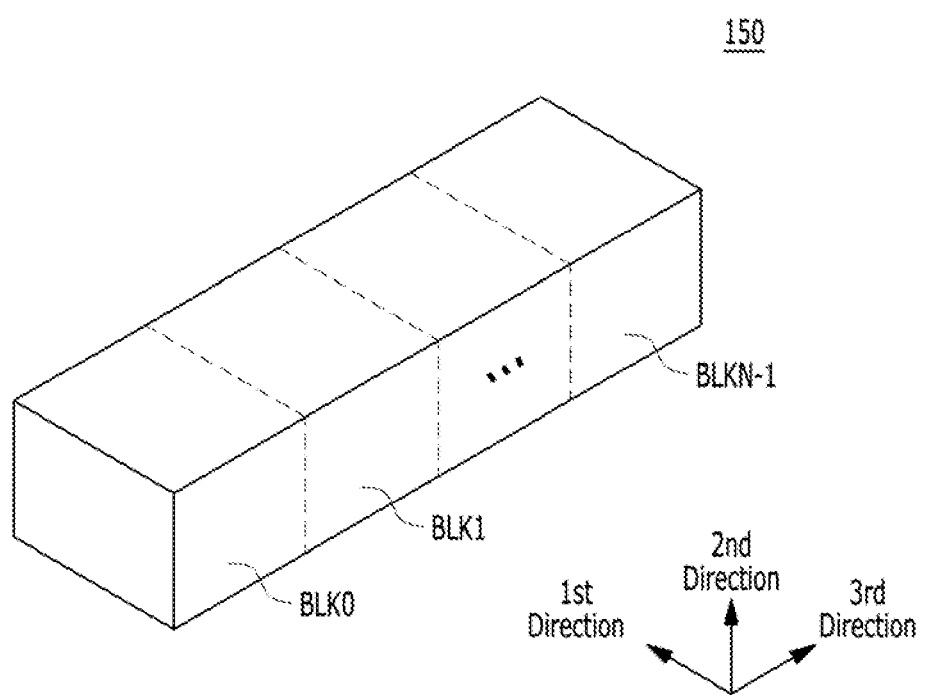
FIGS. 4 to 11 are schematic diagrams illustrating various aspects of a memory device, according to an embodiment of the present invention.
Figure 5:
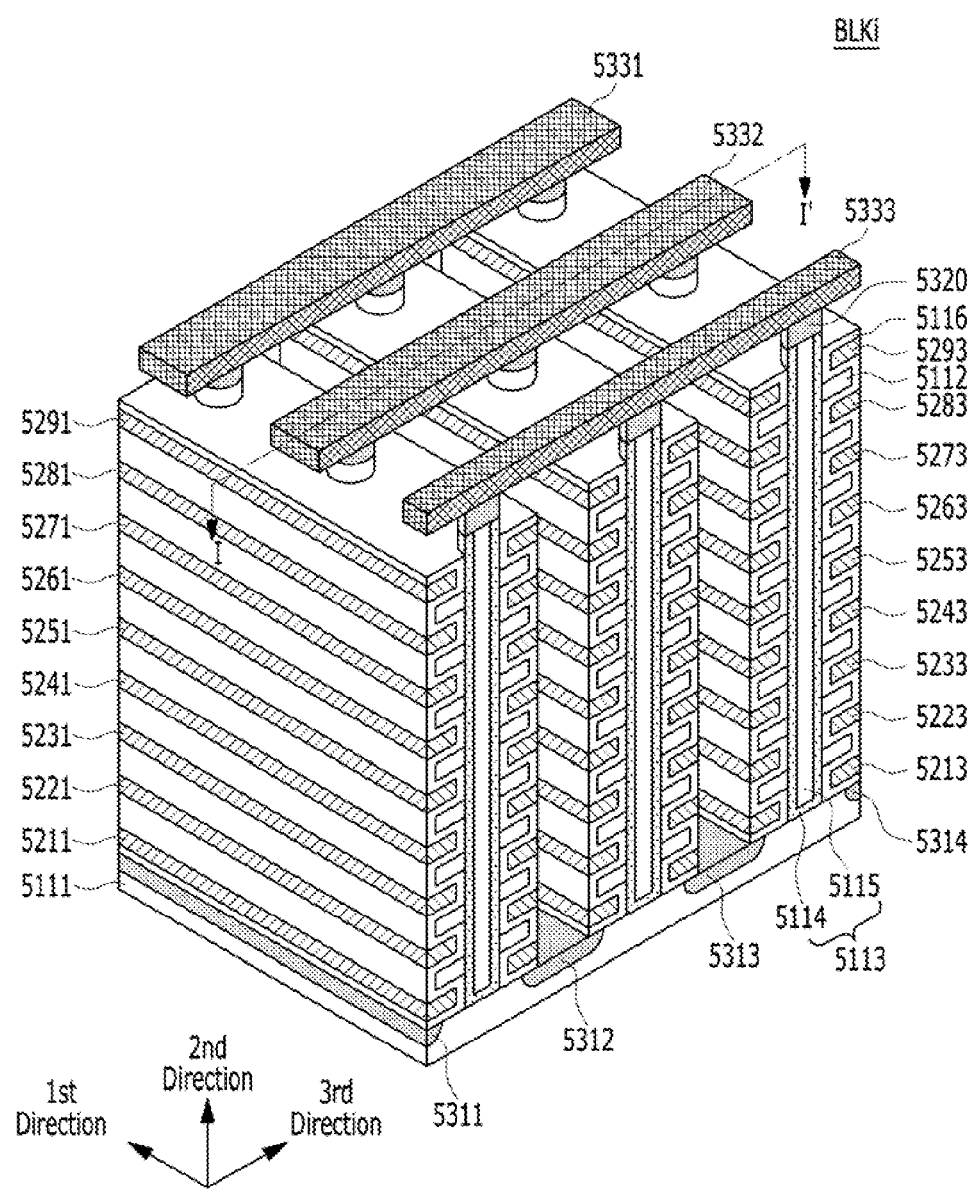
Figure 6:
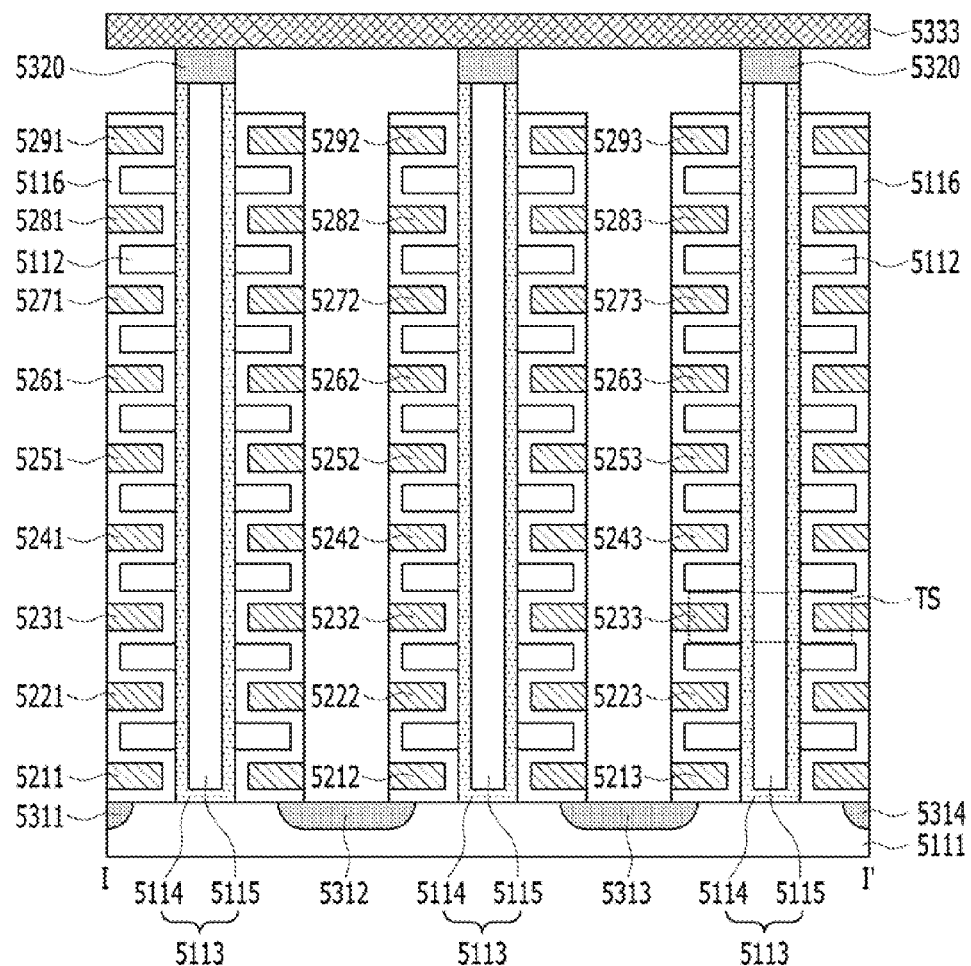

FIG. 5 is a perspective view of one memory block BLKi of the plurality memory blocks BLK0 to BLKN−1 shown in FIG. 4. FIG. 6 is a cross-sectional view taken along a line I-I' of the memory block BLKi shown in FIG. 5.

Referring to FIGS. 5 and 6, memory block BLKi may include a structure which extends in the first to third directions.

The memory block may include a substrate 5111 including a silicon material doped with a first type impurity. For example, the substrate 5111 may include a silicon material doped with a p-type impurity or may be a p-type well, for example, a pocket p-well, and include an n-type well which surrounds the p-type well. While in the embodiment shown it assumed that the substrate 5111 is p-type silicon, it is to be noted that the substrate 5111 is not limited to being p-type silicon.

A plurality of doping regions 5311 to 5314 which extend in the first direction may be provided over the substrate 5111. The doping regions are spaced apart at regular intervals in the third direction. The plurality of doping regions 5311 to 5314 may contain a second type of impurity that is different from the impurity used in substrate 5111. For example, the plurality of doping regions 5311 to 5314 may be doped with an n-type impurity. While it is assumed here that first to fourth doping regions 5311 to 5314 are n-type, it is to be noted that the first to fourth doping regions 5311 to 5314 are not limited to being n-type.

In the region over the substrate 5111 between the first and second doping regions 5311 and 5312, a plurality of dielectric material regions 5112 which extend in the first direction may be spaced apart at regular intervals in the second direction. The dielectric material regions 5112 and the substrate 5111 may also be separated from one another by a predetermined distance in the second direction. The dielectric material regions 5112 may include any suitable dielectric material such as, for example silicon oxide.

In the regions over the substrate 5111 between two consecutive doping regions for example, between doping regions 5311 and 5312, a plurality of pillars 5113 are spaced apart at regular intervals in the first direction. The pillars 5113 extend in the second direction and may pass through the dielectric material regions 5112 so that they may be electrically coupled with the substrate 5111. Each pillar 5113 may include one or more materials. For example, each pillar 5113 may include an in inner layer 5115 and an outer surface layer 5114. The surface layer 5114 may include a doped silicon material doped with an impurity. For example, the surface layer 5114 may include a silicon material doped with the same or same type impurity as the substrate 5111. While it is assumed here, as an example, that the surface layer 5114 may include p-type silicon, the surface layer 5114 is not limited to being p-type silicon and other embodiments may readily envisaged by the skilled person wherein the substrate 5111 and the surface layer 5114 of the pillars 5113 may be doped with an n-type impurity.

The inner layer 5115 of each pillar 5113 may be formed of a dielectric material. The inner layer 5115 may be or include a dielectric material such as, for example, silicon oxide.

In the regions between the first and second doping regions 5311 and 5312, a dielectric layer 5116 may be provided along the exposed surfaces of the dielectric material regions 5112, the pillars 5113 and the substrate 5111. The thickness of the dielectric layer 5116 may be less than one half of the distance between the dielectric material regions 5112. In other words, a region in which a material other than the dielectric material 5112 and the dielectric layer 5116 may be disposed, may be provided between (i) the dielectric layer 5116 (provided over the bottom surface of a first dielectric material of the dielectric material regions 5112) and (ii) the dielectric layer 5116 provided over the top surface of a second dielectric material of the dielectric material regions 5112. The dielectric material regions 5112 lie below the first dielectric material.

In the regions between consecutive doping regions such as in the region between the first and second doping regions 5311 and 5312, a plurality of conductive material regions 5211 to 5291 may be provided over the exposed surface of the dielectric layer 5116. The plurality of the conductive material regions extend in the first direction and are spaced apart at regular intervals in the second direction in an interleaving configuration with the plurality of the dielectric material regions 5112. The dielectric layers 5116 fill the space between the conductive material regions and the dielectric material regions 5112. So for example, the conductive material region 5211 which extends in the first direction may be provided between the dielectric material region 5112 adjacent to the substrate 5111 and the substrate 5111. In particular, the conductive material region 5211 which extends in the first direction may be provided between (i) the dielectric layer 5116 disposed over the substrate 5111 and (ii) the dielectric layer 5116 disposed over the bottom surface of the dielectric material region 5112 adjacent to the substrate 5111.

Each of the conductive material regions 5211 to 5291 which extends in the first direction may be provided between (i) a dielectric layer 5116 disposed over the top surface of one of the dielectric material regions 5112 and (ii) the dielectric layer 5116 disposed over the bottom surface of the next dielectric material region 5112. The conductive material regions 5221 to 5281 which extend in the first direction may be provided between the dielectric material regions 5112. The conductive material region 5291 which extends in the first direction may be provided over the uppermost dielectric material 5112. The conductive material regions 5211 to 5291 which extend in the first direction may be or include a metallic material. The conductive material regions 5211 to 5291 which extend in the first direction may be or include a conductive material such as polysilicon.

In the region between the second and third doping regions 5312 and 5313, the same structures as the structures between the first and second doping regions 5311 and 5312 may be provided. For example, in the region between the second and third doping regions 5312 and 5313, the plurality of dielectric material regions 5112 which extend in the first direction, the plurality of pillars 5113 which are sequentially arranged in the first direction and pass through the plurality of dielectric material regions 5112 in the second direction, the dielectric layer 5116 which is provided over the exposed surfaces of the plurality of dielectric material regions 5112 and the plurality of pillars 5113, and the plurality of conductive material regions 5212 to 5292 which extend in the first direction may be provided.

In the region between the third and fourth doping regions 5313 and 5314, the same structures as between the first and second doping regions 5311 and 5312 may be provided. For example in the region between the third and fourth doping regions 5313 and 5314, the plurality of dielectric material regions 5112 which extend in the first direction, the plurality of pillars 5113 which are sequentially arranged in the first direction and pass through the plurality of dielectric material regions 5112 in the second direction, the dielectric layer 5116 which is provided over the exposed surfaces of the plurality of dielectric material regions 5112 and the plurality of pillars 5113, and the plurality of conductive material regions 5213 to 5293 which extend in the first direction may be provided.

Drains 5320 may be respectively provided over the plurality of pillars 5113. The drains 5320 may be silicon materials doped with second type impurities. The drains 5320 may be silicon materials doped with n-type impurities. While it is assumed for the sake of convenience that the drains 5320 include n-type silicon, it is to be noted that the drains 5320 are not limited to being n-type silicon. For example, the width of each drain 5320 may be larger than the width of each corresponding pillar 5113. Each drain 5320 may be provided in the shape of a pad over the top surface of each corresponding pillar 5113.

Conductive material regions 5331 to 5333 which extend in the third direction may be provided over the drains 5320. The conductive material regions 5331 to 5333 may be sequentially disposed in the first direction. The respective conductive mater al regions 5331 to 5333 may be electrically coupled with the drains 5320 of corresponding regions. The drains 5320 and the conductive material regions 533 to 5333 which extend in the third direction may be electrically coupled with through contact plugs. The conductive material regions 5331 to 5333 which extend in the third direction may be a metallic material. The conductive material regions 5331 to 5333 which extend in the third direction may be a conductive material such as polysilicon.

In FIGS. 5 and 6, the respective pillars 5113 may form strings together with the dielectric layer 5116 and the conductive material regions 5211 to 5291, 5212 to 5292 and 5213 to 5293 which extend in the first direction. The respective pillars 5113 may form NAND strings NS together with the dielectric layer 5116 and the conductive material regions 5211 to 5291, 5212 to 5292 and 5213 to 5293 which extend in the first direction. Each NAND string NS may include a plurality of transistor structures TS.

Figure 7:
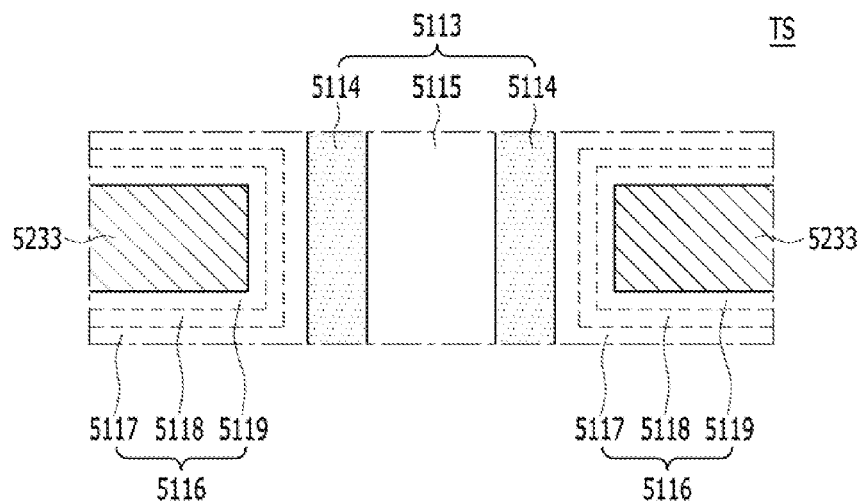

FIG. 7 is a cross-sectional view of the transistor structure TS shown in FIG. 6.

Referring to FIG. 7, in the transistor structure TS shown in FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 which extends in the first direction may be formed as a single layer or multiple layers. The third sub dielectric layer 5119 may be a high-k dielectric layer such as an aluminum oxide layer, a hafnium oxide layer, or the like, which has a dielectric constant greater than the first and second sub dielectric layers 5117 and 5118.

The conductive material 5233 may serve as a gate or a control gate. That is, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for the sake of convenience, the surface layer 5114 of p-type silicon in each of the pillars 5113 will be referred to as a body in the second direction.

The memory block BLKi may include the plurality of pillars 5113. Namely, the memory block BLKi may include the plurality of NAND strings NS. In detail, the memory block BLKi may include the plurality of NAND strings NS which extend in the second direction or a direction perpendicular to the substrate 5111.

Each NAND string NS may include the plurality of transistor structures TS which are disposed in the second direction. At least one of the plurality of transistor structures TS of each NAND string NS may serve as a string source transistor SST. At least one of the plurality of transistor structures TS of each NAND string NS may serve as a ground select transistor GST.

The gates or control gates may correspond to the conductive material regions 5211 to 5291, 5212 to 5292 and 5213 to 5293 which extend in the first direction. In other words, the gates or the control gates may extend in the first direction and form word lines and at least two select lines, at least one source select line SSL and at least one ground select line GSL The conductive material regions 5331 to 5333 which extend in the third direction may be electrically coupled to one end of the NAND strings NS. The conductive material regions 5331 to 5333 which extend in the third direction may serve as bit lines BL. That is, in one memory block BLKi, the plurality of NAND strings NS may be electrically coupled to one bit line BL.

The second type doping regions 5311 to 5314 which extend in the first direction may be provided to the other ends of the NAND strings NS. The second type doping regions 5311 to 5314 which extend in the first direction may serve as common source lines CSL.

Namely, the memory block BLKi may include a plurality of NAND strings NS which extend in a direction perpendicular to the substrate 5111, e.g., the second direction, and may serve as a NAND flash memory block, for example, of a charge capturing type memory, in which a plurality of NAND strings NS are electrically coupled to one bit line BL.

While it is illustrated in FIGS. 5 to 7 that the conductive material regions 5211 to 5291, 5212 to 5292 and 5213 to 5293 which extend in the first direction are provided in 9 layers, it is to be noted that the conductive material regions 5211 to 5291, 5212 to 5292 and 5213 to 5293 which extend in the first direction are not limited to being provided in 9 layers. For example, conductive material regions which extend in the first direction may be provided in 8 layers, 16 layers or any multiple of layers. In other words, in one NAND string NS, the number of transistors may be 8, 16 or more.

While it is illustrated in FIGS. 5 to 7 that 3 NAND strings NS are electrically coupled to one bit line BL, it is to be noted that the embodiment is not limited to having 3 NAND strings NS that are electrically coupled to one bit line BL. In the memory block BLKi, m number of NAND strings NS may be electrically coupled to one bit line BL, m being a positive integer. According to the number of NAND strings NS which are electrically coupled to one bit line BL, the number of conductive material regions 5211 to 5291, 5212 to 5292 and 5213 to 5293 which extend in the first direction and the number of common source lines 5311 to 5314 may be controlled as well.

Further, while it is illustrated in FIGS. 5 to 7 that 3 NAND strings NS are electrically coupled to one conductive material which extends in the first direction, it is to be noted that the embodiment is not limited to having 3 NAND strings NS electrically coupled to one conductive material which extends in the first direction. For example, n number of NAND strings NS may be electrically coupled to one conductive material which extends in the first direction, n being a positive integer. According to the number of NAND strings NS which are electrically coupled to one conductive material which extends in the first direction the number of bit lines 5331 to 5333 may be controlled as well.

FIG. 8 is an equivalent circuit diagram illustrating the memory block BLKi having a first structure as described with reference to FIGS. 5 to 7.

Referring to FIG. 8, block BLKi, may have a plurality of NAND strings NS11 to NS31 between a first bit line BL1 and a common source line CSL. The first bit line BL1 may correspond to the conductive material region 5331 of FIGS. 5 and 6, which extends in the third direction. NAND Strings NS12 to NS32 may be provided between a second bit line BL2 and the common source line CSL. The second bit line 3L2 may correspond to the conductive material region 5332 of FIGS. 5 and 6, which extends in the third direction. NAND strings NS13 to NS33 may be provided between a third bit line BL3 and the common source line CSL. The third bit line 6L3 may correspond to the conductive material region 5333 of FIGS. 5 and 6, which extends in the third direction.

A source select transistor SST of each NAND string NS may be electrically coupled to a corresponding bit line BL. A ground select transistor GST of each NAND string NS may be electrically coupled to the common source line CSL. Memory cells MC may be provided between the source select transistor SST and the ground select transistor GST of each NAND string NS.

In this example, NAND strings NS may be defined by units of rows and columns and NAND strings NS which are electrically coupled to one bit line may form one column. The NAND strings NS11 to NS31 which are electrically coupled to the first bit line BL1 may correspond to a first column, the NAND strings NS12 to NS32 which are electrically coupled to the second bit line BL2 may correspond to a second column, and the NAND strings NS13 to NS33 which are electrically coupled to the third bit line BL3 may correspond to a third column. NAND strings NS which are electrically coupled to one source select line SSL may form one row. The NAND strings NS11 to NS13 which are electrically coupled to a first source select line SSL1 may form a first row, the NAND strings NS21 to NS23 which are electrically coupled to a second source select line SSL2 may form a second row, and the NAND strings NS31 to NS33 which are electrically coupled to a third source select line SSL3 may form a third row.

In each NAND string NS, a height may be defined. In each NAND string NS, the height of a memory cell MC1 adjacent to the ground select transistor GST may have a value '1'. In each NAND string NS, the height of a memory cell may increase as the memory cell gets closer to the source select transistor SST when measured from the substrate 5111. For example, in each NAND string NS the height of a memory cell MC6 adjacent to the source select transistor SST may be 7.

The source select transistors SST of the NAND strings NS in the same row may share the source select line SSL. The source select transistors SST of the NAND strings NS in different rows may be respectively electrically coupled to the different source select lines SSL1, SSL2 and SSL3.

The memory cells at the same height in the NAND strings NS in the same row may share a word line WL. That is, at the same height the word lines WL electrically coupled to the memory cells MC of the NAND strings NS in different rows may be electrically coupled. Dummy memory cells DMC at the same height in the NAND strings NS of the same row may share a dummy word line DWL. Namely, at the same height or level, the dummy word lines DWL electrically coupled to the dummy memory cells DMC of the NAND strings NS in different rows may be electrically coupled.

The word lines WL or the dummy word lines DWL located at the same level or height or layer may be electrically coupled with one another at layers where the conductive material regions 5211 to 5291, 5212 to 5292 and 5213 to 5293 which extend in the first direction may be provided. The conductive material regions 5211 to 5291, 5212 to 5292 and 5213 to 5293 which extend in the first direction may be electrically coupled in common to upper layers through contacts. At the upper layers, the conductive material regions 5211 to 5291, 5212 to 5292 and 5213 to 5293 which extend in the first direction may be electrically coupled. In other words, the ground select transistors GST of the NAND strings NS in the same row may share the ground select line GSL. Further, the ground select transistors GST of the NAND strings NS in different rows may share the ground select line GSL. That is, the NAND strings NS11 to NS13, NS21 to NS23 and NS31 to NS33 may be electrically coupled to the ground select line GSL.

The common source line CSL may be electrical y coupled to the NAND strings NS. Over the active regions and over the substrate 5111, the first to fourth doping regions 5311 to 5314 may be electrically coupled. The first to fourth doping regions 5311 to 5314 may be electrically coupled to an upper layer through contacts and, at the upper layer, the first to fourth doping regions 5311 to 5314 may be electrically coupled.

For example, as shown in FIG. 8, the word lines WL of the same height or level may be electrically coupled. Accordingly, when a word line WL at a specific height is selected, all NAND strings NS which are electrically coupled to the word line WL may be selected. The NAND strings NS in different rows may be electrically coupled to different source select lines SSL. Accordingly, among the NAND strings NS electrically coupled to the same word line WL by selecting one of the source select lines SSL1 to SSL3 the NAND strings NS in the unselected rows may be electrically isolated from the bit lines BL1 to BL3. In other words, by selecting one of the source select lines SSL . . . 1 to SSL3, a row of NAND strings NS may be selected. Moreover, by selecting one of the bit lines BL1 to BL3 the NAND strings NS in the selected rows may be selected in units of columns.

In each NAND string NS a dummy memory cell DMC may be provided. In FIG. 8, the dummy memory cell DMC may be provided between a third memory cell MC3 and a fourth memory cell MC4 in each NAND string NS. That is, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into memory cell groups by the dummy memory cell DMC. In the divided memory cell groups, memory cells, for example, MC1 to MC3, adjacent to the ground select transistor GST may be referred to as a lower memory cell group, and memory cells, for example, MC4 to MC6, adjacent to the string select transistor SST may be referred to as an upper memory cell group.

Hereinafter, detailed descriptions will be made with reference to FIGS. 9 to 11, which show a memory device in a memory system, according to another embodiment of the invention.

Figure 9:
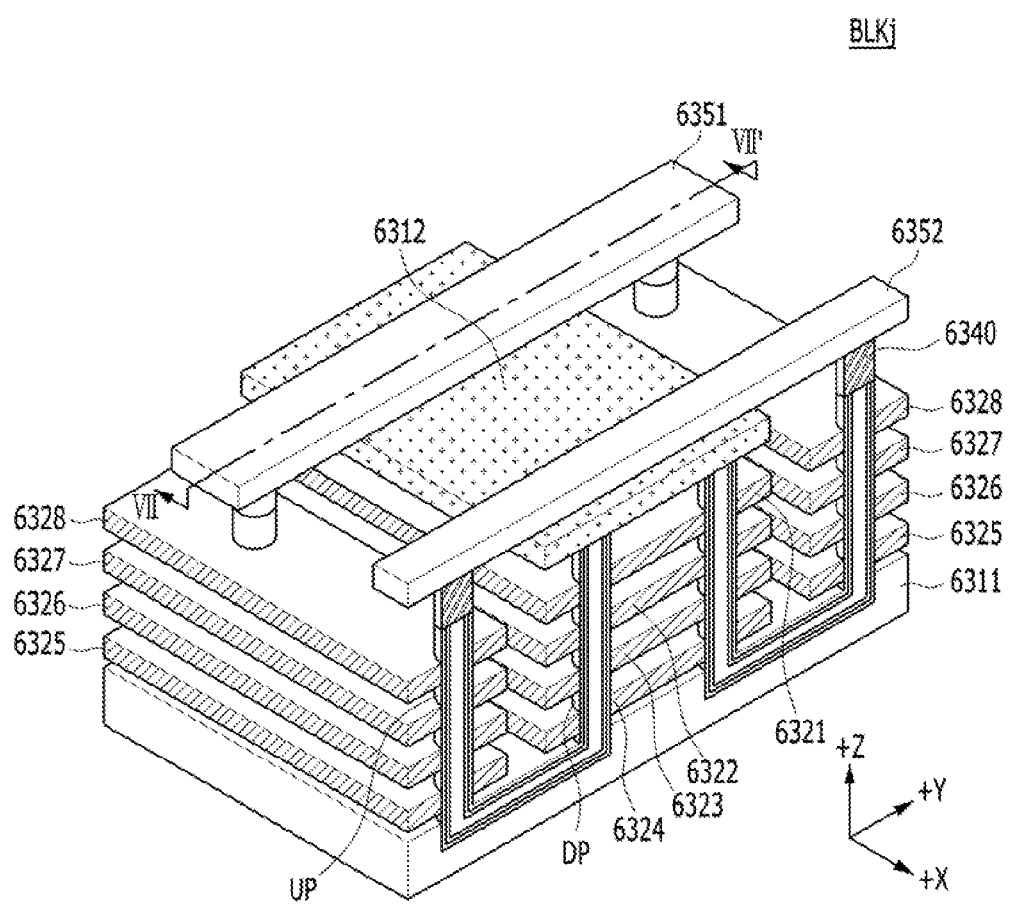

In particular, FIG. 9 is a perspective view schematically illustrating a memory device implemented with a three-dimensional (3D) nonvolatile memory device, which is different from the first structure described above with reference to FIGS. 5 to 8. FIG. 10 is a cross-sectional view illustrating the memory block BLKj taken along the line VII-VII' of FIG. 9.

Figure 10:
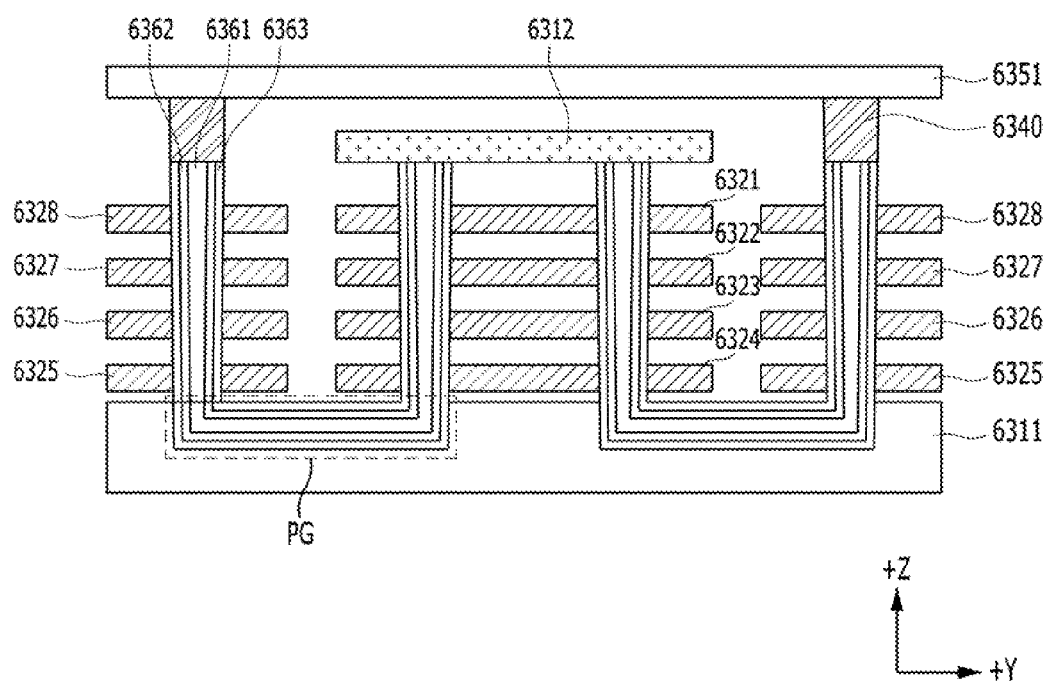

Referring to FIGS. 9 and 10, the memory block BLKj may include structures which extend in the first to third directions and may include a substrate 6311. The substrate 6311 may include a silicon material doped with a first type impurity. For example, the substrate 6311 may include a silicon material doped with a p-type impurity or may be a p-type well, for example, a pocket p-well, and include an n-type well which surrounds the p-type well. While it is assumed in the embodiment shown, that the substrate 6311 is p-type silicon, it is to be noted that the substrate 6311 is not limited to being p-type silicon.

First to fourth conductive material regions 6321 to 6324 which extend in the x-axis direction and the y-axis direction are provided over the substrate 6311. The first to fourth conductive material regions 6321 to 6324 may be separated by a predetermined distance in the z-axis direction.

Fifth to eighth conductive material regions 6325 to 6328 which extend in the x-axis direction and the y-axis direction may be provided over the substrate 6311. The fifth to eighth conductive material regions 6325 to 6328 may be separated by the predetermined distance in the z-axis direction. The fifth to eighth conductive material regions 6325 to 6328 may be separated from the first to fourth conductive material regions 6321 to 6324 in the y-axis direction.

A plurality of lower pillars DP which pass through the first to fourth conductive material regions 6321 to 6324 may be provided. Each lower pillar DP extends in the z-axis direction. Also, a plurality of upper pillars UP which pass through the fifth to eighth conductive material regions 6325 to 6328 may be provided. Each upper pillar UP extends in the z-axis direction.

Each of the lower pillars DP and the upper pillars UP may include an internal material 6361, an intermediate layer 6362, and a surface layer 6363. The intermediate layer 6362 may serve as a channel of the cell transistor. The surface layer 6363 may include a blocking dielectric layer, a charge storing layer and a tunneling dielectric layer.

The lower pillar DP and the upper pillar UP may be electrically coupled through a pipe gate PG. The pipe gate PG may be disposed in the substrate 6311. For instance, the pipe gate PG may include the same material as the lower pillar DP and the upper pillar UP.

A doping material 6312 of a second type which extends in the x-axis direction and the y-axis direction may be provided over the lower pillars DP. For example, the doping material 6312 of the second type may include an n-type silicon material. The doping material 6312 of the second type may serve as a common source line CSL.

Drains 6340 may be provided over the upper pillars UP. The drains 6340 may include an n-type silicon material. First and second upper conductive material regions 6351 and 6352 which extend in the y-axis direction may be provided over the drains 6340.

The first and second upper conductive material regions 6351 and 6352 may be separated in the x-axis direction. The first and second upper conductive material regions 6351 and 6352 may be formed of a metal. The first and second upper conductive material regions 6351 and 6352 and the drains 6340 may be electrically coupled through contact plugs. The first and second upper conductive material regions 6351 and 6352 respectively serve as first and second bit lines BL1 and BL2.

The first conductive material 6321 may serve as a source select line SSL, the second conductive material 6322 may serve as a first dummy word line DWL1, and the third and fourth conductive material regions 6323 and 6324 serve as first and second main word lines MWL1 and MWL2 respectively. The fifth and sixth conductive material regions 6325 and 6326 serve as third and fourth main word lines MWL3 and MWL4, respectively, the seventh conductive material 6327 may serve as a second dummy word line DWL2, and the eighth conductive material 6328 may serve as a drain select line DSL.

The lower pillar DP and the first to fourth conductive material regions 6321 to 6324 adjacent to the lower pillar DP form a lower string. The upper pillar UP and the fifth to eighth conductive material regions 6325 to 6328 adjacent to the upper pillar UP form an upper string. The lower string and the upper string may be electrically coupled through the pipe gate PG. One end of the lower string may be electrically coupled to the doping material 6312 of the second type which serves as the common source line CSL. One end of the upper string may be electrically coupled to a corresponding bit line through the drain 6340. One lower string and one upper string form one cell string which is electrically coupled between the doping material 6312 of the second type serving as the common source line CSL and a corresponding one of the upper conductive material layers 6351 and 6352 serving as the bit line BL.

That is the lower string may include a source select transistor SST, the first dummy memory cell DMC1, and the first and second main memory cells MMC1 and MMC2. The upper string may include the third and fourth main memory cells MMC3 and MMC4, the second dummy memory cell DMC2, and a drain select transistor DST.

In FIGS. 9 and 10, the upper string and the lower string may form a NAND string NS, and the NAND string NS may include a plurality of transistor structures TS. Since the transistor structure included in the NAND string NS in FIGS. 9 and 10 is described above in detail with reference to FIG. 7, a detailed description thereof will be omitted herein.

Figure 11:
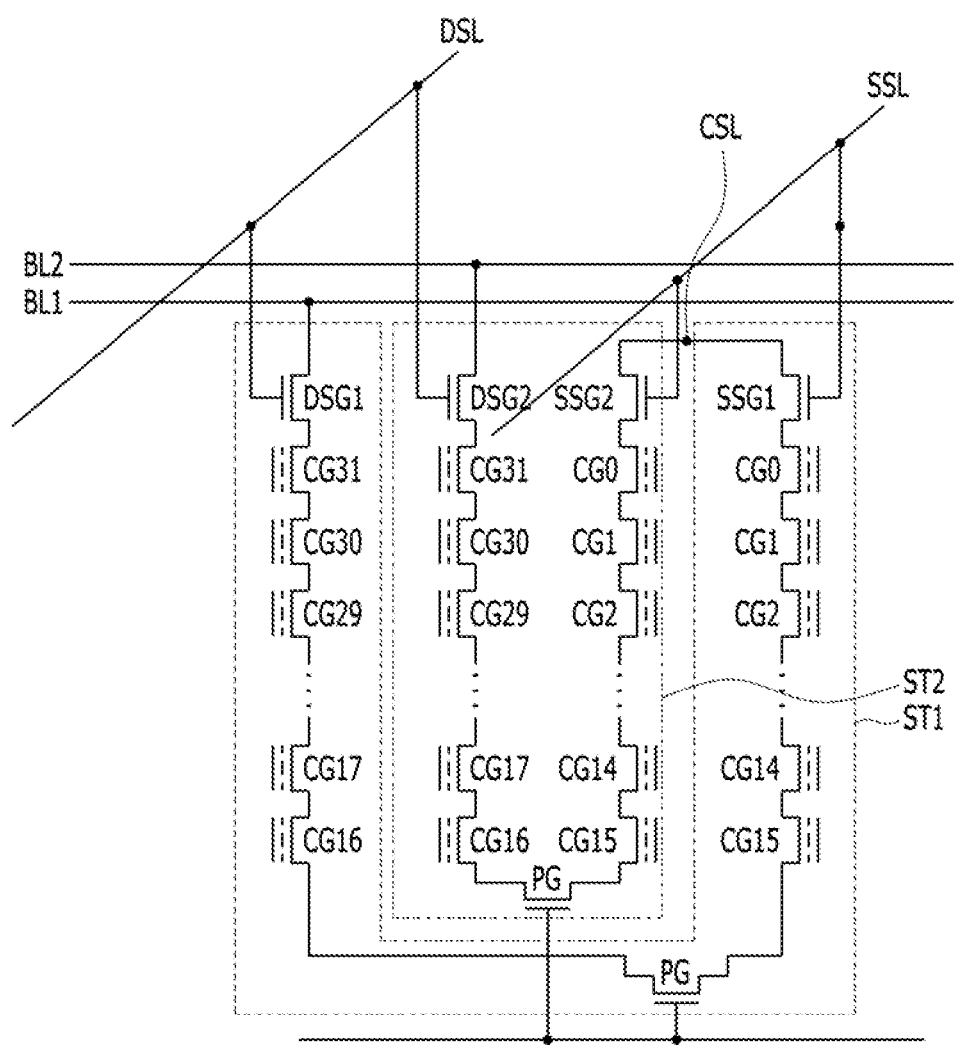

FIG. 11 is a circuit diagram illustrating the equivalent circuit of the memory block BLKj having the second structure as described above with reference to FIGS. 9 and 10. For the sake of convenience, only a first string and a second string, which form a pair in the memory block BLKj in the second structure are shown.

Referring to FIG. 11, in the memory block BLKj having the second structure, cell strings each of which is implemented with one upper string and one lower string electrically coupled through the pipe gate PG as described above with reference to FIGS. 9 and 10, may be provided, in such a way as to define a plurality of pairs.

For example, in the certain memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example, at least one source select gate SSG2 and at least one drain select gate DSG2 may form a second string ST2.

The first string ST1 and the second string ST2 may be electrical y coupled to the same drain select line DSL and the same source select line SSL. The first string ST1 may be electrically coupled to a first bit line BL1, and the second string ST2 may be electrically coupled to a second bit line BL2.

While it is described in FIG. 11 that the first string ST1 and the second string ST2 are electrically coupled to the same drain select line DSL and the same source select line SSL, it may be envisaged that the first string ST1 and the second string ST2 may be electrically coupled to the same source select line SSL and the same bit line BL, the first string ST1 may be electrically coupled to a first drain select line DSL1 and the second string S12 may be electrically coupled to a second drain select line DSL2. Further it may be envisaged that the first string ST1 and the second string ST2 may be electrically coupled to the same drain select line DSL and the same bit line BL, the first string ST1 may be electrically coupled to a first source select line SSL1 and the second string ST2 may be electrically coupled a second source select line SSL2.

Figure 12:
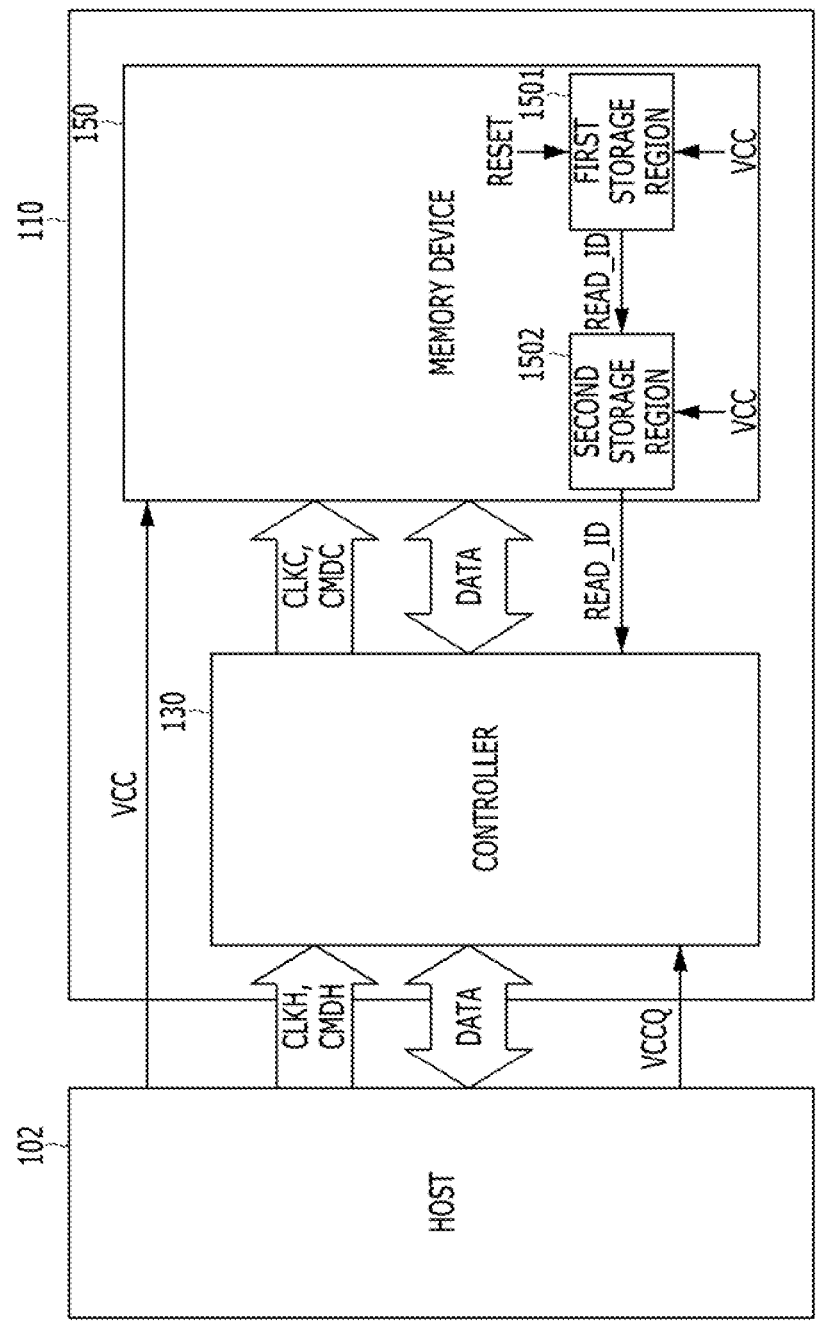
FIG. 12 is a diagram illustrating a memory system which supports a sleep mode operation in accordance with an embodiment of the present invention.

FIG. 12 is a diagram illustrating a memory system which supports a sleep mode operation in accordance with an embodiment of the present invention.

FIG. 12 illustrates the configuration of a memory system 110 which supports a sleep mode operation in accordance with an embodiment of the present invention and the host 102.

The memory system 110 illustrated in FIG. 12 may include a controller 130 and a memory device 150. The memory device 150 may include a first storage region 1501 and a second storage region 1502.

The memory system 110 may store data DATA inputted from the host 102 in response to a clock CLKH and a command CMDH which are inputted from the host 102, or output the data DATA stored therein to the host 102.

The controller 130 included in the memory system 110 may generate an internal clock CLKC and an internal command CMDC which are used in the memory device 150 in response to the clock CLKH and the command CMDH which are inputted from the host 102, and control the memory device 150 to perform an operation of inputting/outputting data DATA between the host 102 and the memory device 150 using the Internal clock CLKC and internal command CMDC.

The memory device 150 may operate using a first voltage VCC received from the host 102. The controller 130 may operate using a second voltage VCCQ received from the host 102. As such, the memory device 150 and the controller 130 may use different voltages.

The first voltage VCC supplied to the memory device 150 from the host 102 can be stopped for minimizing power consumption of the memory system 110 when the memory system 110 enters the sleep modes. The memory system 110 in the sleep mode normally wakes up according to a request of the host 102. To wake up the memory system 110, the second voltage VCCQ supplied to the controller 130 needs to be retained even though the first voltage VCC supplied to the memory device 150 from the host 102 is stopped. Thus, the method in which the host 102 supplies different voltages to the memory device 150 and the controller 130 may be used.

The memory system 110 may enter the sleep mode in the following two cases. In the first case, the host 102 transmits a specific command to the controller 130 in order to control the memory system 110 to enter the sleep mode. That is according to a request of the host 102 the memory system 110 may enter the sleep mode.

In the second case, the controller 130 in the memory system 110 enters the sleep mode by itself, regardless of a request of the host 102. For example when no access to the memory device 150 from the host 102 occurs during a preset time or more, or when the memory device 150 performs no operation during the preset time or more that is, an idle state, the controller 130 may sense the state and enter the sleep mode by itself.

In the first case, since the memory system 110 has entered the sleep mode according to the request of the host 102, the host 102 recognizes that the memory system 110 has entered the sleep mode. Thus, the host 102 may selectively perform an operation of stopping the supply of the first voltage VCC to the memory device 150. That is, according to the operation of the host 102, the first voltage VCC may be continuously supplied to the memory device 150, or not be supplied to the memory device 150. As described above, to reduce the power used in the memory system 110 the supply of the first voltage VCC needs to be stopped. However, since this operation is an operation of the host 102 there is no way that the memory system 110 can previously know whether or not the host 102 will stop the supply of the first voltage VCC.

In the second case, since the memory system 110 has entered the sleep mode by itself regardless of a request of the host 102 the host 102 cannot know whether the memory system 110 has entered the sleep mode. Thus, the host 102 cannot arbitrarily stop the supply of the first voltage VCC to the memory device 150. However, when the condition that the memory system 110 enters the sleep mode exceeds the preset time, it may indicate that the memory system 110 receives no request from the host 102. Thus, expecting that the memory system 110 will enter the sleep mode, the host 102 may stop the supply of the first voltage VCC. That is, even in the second case, there is no way that the memory system 110 can know whether or not the host 102 will stop the supply of the first voltage VCC, as in the first case.

As described above, although the memory system 110 enters the sleep mode, a supply of the first voltage VCC is not stopped at all times, but selectively stopped according to the operation of the host 102. In particular, since the first voltage VCC supplied to the memory device 150 and the second voltage VCCQ supplied to the controller 130 are supplied through independent paths, the controller 130 cannot determine that the supply of the first voltage VCC will be stopped.

When the supply of the first voltage VCC is stopped and then resumed, the memory device 150 needs to be reset. That is, when the supply of the first voltage VCC is stopped, operation information READ_ID stored in a temporary storage space of the memory device 150 may be deleted. Thus, when the supply of the first voltage VCC is stopped and then resumed, the operation information READ_ID deleted needs to be normalized.

For example, the identification information, capacity information, and setting information of the memory device 150 must not be arbitrarily changed during the operation of the memory device 150 after the identification information, the capacity information, and the setting information are determined during the fabrication process of the memory device 150. Thus, the operation information READ_ID may be stored in a specific space which cannot be accessed from the outside of the memory device 150, for example, the first storage region 1501, and then read into a space which can be accessed from outside when the memory device 150 is reset, for example, the second storage region 1502.

Since the information stored in the first storage region 1501 must not be deleted when the supply of the first voltage VCC is stopped, the first storage region 1501 needs to have a nonvolatile characteristic. However, it is preferable for the second storage region 1502 to occupy a relatively small area and operate at a relatively high speed, rather than retaining the value stored therein when the supply of the first voltage VCC is stopped. Thus, the second storage region 1502 may be set to a space having a volatile characteristic such as a register.

As described above, when the memory device 150 is reset in response to a reset signal RESET, the operation information READ_IN stored in the first storage region 1501 may be read and stored into the second storage region 1502. At this time, the operation of the first storage region 1501 to output the operation information READ_ID in response to the reset signal RESET may be considered as an operation which is spontaneously performed in the memory device 150 regardless of control of the controller 130. In this way, the operation information READ_ID stored in the second storage region 1502 may be read by the controller 130 outside the memory device 150, and used for an operation such as a read or write operation after the reset operation.

In short, the memory device 150 may require the reset operation when the supply of the first voltage VCC from the host 102 is stopped and the memory device 150 enters the sleep mode. However, although the memory device 150 has entered the sleep mode, the supply of the first voltage VCC from the host 102 is not necessarily stopped. When the supply of the first voltage VCC from the host 102 is not stopped and the memory device 150 has entered the sleep mode, the memory device 150 does not need to be reset.

For this reason, when the memory device 150 wakes up from the sleep mode, the controller 130 needs to check whether the supply of the first voltage VCC to the memory device 150 had been stopped. According to the checking result, the controller 130 needs to determine whether the reset operation of the memory device 150 is necessary.

However, when a power detection circuit which checks whether power is used a normal operation of the power detection circuit cannot be guaranteed since the power detection circuit needs to be operated when the memory device 150 wakes up from the sleep mode.

Thus, when the memory device 150 is waken up from the sleep mode according to a request of the host 102, the controller 130 may check the operation information READ_ID of the memory device 150, and then determine whether to reset the memory device 150 according to the checking result.

As described above, the operation information READ_ID of the memory device 150 may include the identification information, capacity information, and setting information of the memory device 150. The operation information READ_ID must not be arbitrarily changed during the operation of the memory device 150 once the operation information READ_ID is determined during the fabrication process of the memory device 150. Thus, the operation information READ_ID may be stored in the first storage region 1501 which cannot be accessed from the outside of the memory device 150 and then read into the second storage region 1502 which can be accessed from outside when the memory device 150 is reset.

Furthermore, the first storage region 1501 may have a nonvolatile characteristic that the value stored therein is retained even though the supply of the first voltage VCC is stopped. The second storage region 1502 may have a volatile characteristic that the value stored therein is deleted when the supply of the first voltage VCC is stopped.

Thus, when the supply of the first voltage VCC is stopped and the memory device 150 enters the sleep mode, the operation information READ_ID stored in the second storage region 1502 may have a value which is deleted and reset. On the other hand, when the supply of the first voltage VCC is not stopped and the memory device 150 enters the sleep mode, the operation information READ_ID stored in the second storage region 1502 may have an arbitrary value which is not reset.

Using the characteristic of the operation information READ_ID, the controller 130 may read the operation information READ_ID from the second storage region 1502 when the memory device 150 wakes up from the sleep mode, and check whether the read information READ_ID was reset. When the operation information READ_ID was reset it may indicate that the supply of the first voltage VCC was stopped when the memory device 150 entered the sleep mode. Thus, the memory device 150 may be reset. On the other hand, when the operation information READ_ID has an arbitrary value which is not reset, it may indicate that the supply of the first voltage VCC was not stopped when the memory device 150 entered the sleep mode. Thus, the memory device 150 may not be reset.

For reference, the controller 130 may include various components for controlling the operation of the memory device 150. However, since the components have been already described with reference to FIG. 1, the detailed descriptions thereof are omitted herein.

In the present embodiment, it has been described that the operation READ_ID includes the identification information, capacity information, and setting information of the memory device 150. This is only an example, and the operation information READ_ID may include other values according to the type and characteristic of the memory device.

Furthermore, a request provided from the host 102 to wake up the memory device 150 in the sleep state may include a general operation request. For example the general operation request may be a read or write operation request for the memory device.

Figure 13:
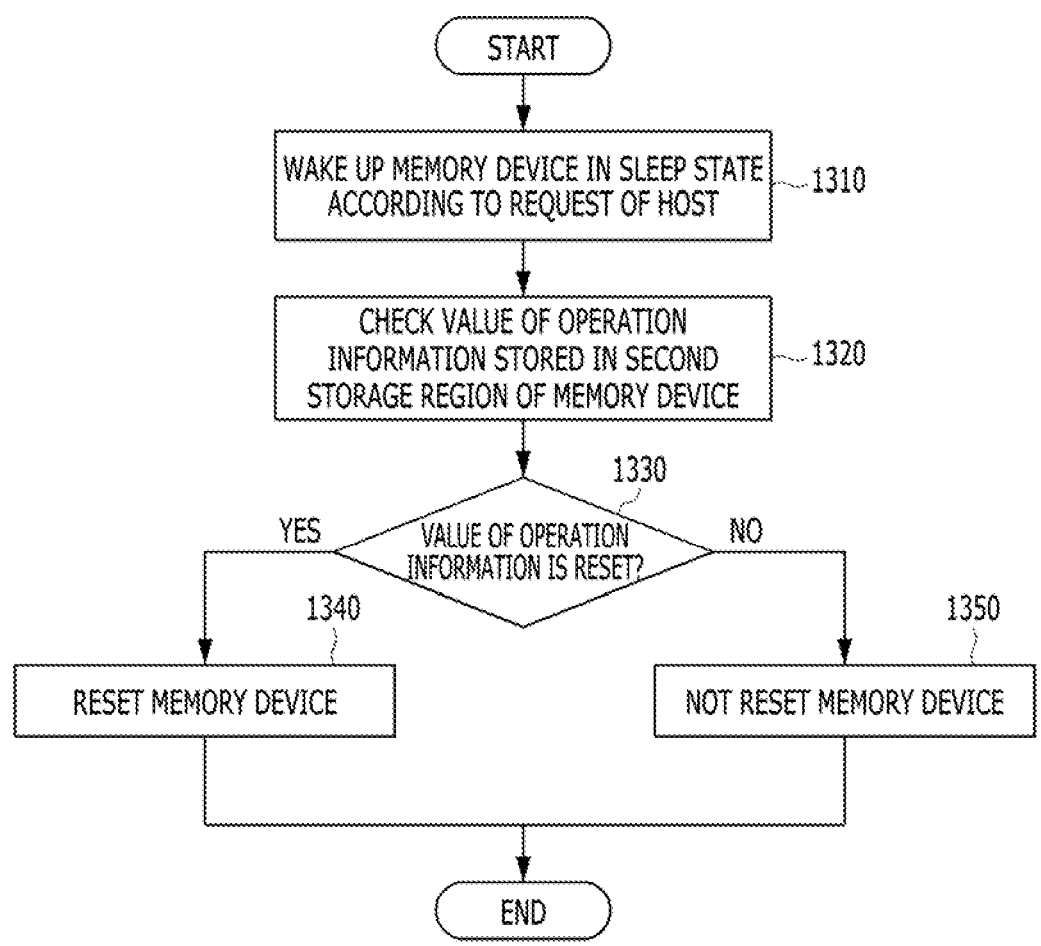
FIG. 13 is a flowchart for describing awake-up operation of the memory system illustrated in FIG. 12.

FIG. 13 is a flowchart for describing the wake-up operation of the memory system illustrated in FIG. 12. Referring to FIG. 13 the operation of the memory system may be started as the memory device 150 in the sleep state is waken up according to a request of the host 102. When the memory device 150 is waken up according to the request of the host 102, the memory system may check the value of operation information READ_ID stored in the second storage region 1502 in the memory device 150.

At this time, when the supply of the first voltage VCC from the host 102 has been stopped while the memory device 150 was in the sleep mode, the operation information READ_ID stored in the second storage region 1502 may have a reset value. On the other hand, when the supply of the first voltage VCC from the host 102 has never been stopped while the memory device 150 was in the sleep mode, the operation information READ_ID stored in the second storage region 1502 may have a non-reset value.

Thus, the memory system may check whether the value of the operation information READ_ID is reset and the operation information READ_ID is checked when the memory device 150 is waken up.

When the value of the operation information READ_ID is reset, the memory system may reset the memory device. When the value of the operation information READ_ID is not reset, the memory system may not reset the memory device.

After the memory device 150 is waken up through the above-described process, the memory device 150 can normally perform a general operation according to a request of the host 102.

When the embodiment of the present invention is applied as described above, the memory system may check whether the value of the operation information READ_ID in the memory device 150 is reset when the memory device 150 is waken up from the sleep mode. Through the operation, the memory system can easily check whether the power supply to the memory device 150 has been stopped while the memory device 150 was in the sleep mode. Through the checking result, the memory system can select whether to perform a reset operation when the memory device 150 is waken up from the sleep mode. This operation can prevent the memory device 150 from being frequently reset.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
a memory device that operates using a first voltage received from a host, wherein memory device is suitable for storing a value of operation information, and waking up from a sleep state in response to a request of the host; and
a controller that operates using a second voltage received from the host,
wherein the controller is suitable for checking the value of operation information stored in a storage region having a volatile characteristic and selectively resetting the memory device according to the value of operation information when the memory device wakes up from the sleep state.

2. The memory system of claim 1,
wherein the operation information is stored in a first storage region of the memory device and transmitted to a second storage region of the memory device when the memory device wakes up,
wherein the controller cannot access the first storage region and can access the second storage region.

3. The memory system of claim 2,
wherein the first voltage is selectively supplied to the memory device according to operation of the host when the memory device is in the sleep state.

4. The memory system of claim 3,
wherein the operation information stored in the first storage region is retained while the first voltage is not supplied to memory device, and
wherein the operation information stored in the second storage region is reset when the first voltage is not supplied to the memory device.

5. The memory system of claim 4,
wherein the controller reads the operation information stored in the second storage region when the memory device is waken up and resets the memory device,
wherein the controller resets the memory device when the operation information stored in the second storage region is reset, and wherein the controller does not reset the memory device when the operation information stored in the second storage region is not reset.

6. The memory system of claim 1, wherein the controller controls so that the memory device enters the sleep state according to a request from the host.

7. The memory system of claim 1, wherein the controller determines that the memory device is at an idle state when no request is provided from the host to the memory device during a preset time period, and
wherein the controller controls the memory device to enter the sleep state when the memory device is at the idle state.

8. The memory system of claim 2, wherein the operation information comprises identification information, capacity information, and setting information of the memory device, and
wherein the operation information is not accessible by the host.

9. An operation method of a memory system which includes the memory system includes a memory device and a controller, comprising:
   operating the memory device using a first voltage received from a host; and
   operating the controller using a second voltage received from the host,
   wherein the operating of the controller comprises:
   checking operation information stored in a storage region having a volatile characteristic of the memory device when the memory device wakes up from a sleep state according to a request of the host; and
   selectively resetting the memory device according to a result of the checking of the operation information.

10. The operation method of claim 9, further comprising:
    storing the operation information in a first storage region of the memory device, wherein the first storage region is not accessed by the controller, and
    transmitting the operation information to a second storage region of the memory device when the memory device wakes up, wherein the controller can access the second storage region.

11. The operation method of claim 10, wherein the first voltage is selectively supplied to the memory device according to the operation of the host when the memory device is in the sleep state.

12. The operation method of claim 11, wherein the operation information stored in the first storage region is retained when the first voltage is not supplied to the memory device, and
wherein the operation information stored in the second storage region is reset when the first voltage is not supplied to the memory device.

13. The operation method of claim 12, wherein the checking of the operation information comprises:
   checking whether the operation information stored in the second storage region is reset when the memory device wakes up.

14. The operation method of claim 13, wherein the selectively resetting of the memory device comprises:
   resetting the memory device when it is determined that the operation information stored in the second storage region is reset; and
   not resetting the memory device when it is determined that the operation information stored in the second storage region is not reset.

15. The operation method of claim 9, wherein the operating of the controller further comprises:
   controlling the memory device so that the memory device enters the sleep state according to a request from the host.

16. The operation method of claim 9, wherein the operating of the controller further comprises:
   determining that the memory device is in an idle state when no request is provided to the memory device from the host during a preset time period, and
   controlling the memory device so that the memory device enters the sleep state when the memory device is in the idle state.

17. The operation method of claim 10, wherein the operation information comprises identification information, capacity information, and setting information of the memory device, and
wherein the operation information is not accessible by the host.

* * * * *